United States Patent
Shintani et al.

[11] Patent Number: 6,137,546
[45] Date of Patent: Oct. 24, 2000

[54] AUTO PROGRAM FEATURE FOR A TELEVISION RECEIVER

[75] Inventors: Peter Rae Shintani, San Diego; Hirofumi Usui, Poway; Kenichiro Toyoshima, San Diego, all of Calif.

[73] Assignees: Sony Corporation, Tokyo, Japan; Sony Electronics Inc., Park Ridge, N.J.

[21] Appl. No.: 09/119,153

[22] Filed: Jul. 20, 1998

[51] Int. Cl.[7] ................................................... H04N 5/50
[52] U.S. Cl. .......................................... 348/731; 348/732
[58] Field of Search .................................... 348/553, 554, 348/555, 731, 732, 733; 455/185.1, 186.1; H04N 5/50

[56] References Cited

U.S. PATENT DOCUMENTS

| | | | |
|---|---|---|---|
| T938,005 | 9/1975 | Colton et al. | 444/1 |
| T940,020 | 11/1975 | Brechling et al. | 444/1 |
| 4,130,804 | 12/1978 | Mogi et al. | 325/464 |
| 4,377,849 | 3/1983 | Finger et al. | 364/491 |
| 4,860,380 | 8/1989 | Mengel | 348/731 |
| 4,888,819 | 12/1989 | Oda et al. | 358/192.1 |
| 5,051,938 | 9/1991 | Hyduke | 364/578 |
| 5,111,413 | 5/1992 | Lazansky et al. | 364/578 |
| 5,182,646 | 1/1993 | Keenan | 348/732 |
| 5,257,106 | 10/1993 | Maruoka | 348/731 |
| 5,297,053 | 3/1994 | Pease et al. | 364/474.24 |
| 5,301,318 | 4/1994 | Mittal | 395/600 |
| 5,418,728 | 5/1995 | Yada | 364/468 |
| 5,426,591 | 6/1995 | Ginetti et al. | 364/489 |
| 5,461,427 | 10/1995 | Duffield et al. | 348/555 |
| 5,487,018 | 1/1996 | Loos et al. | 364/489 |
| 5,491,640 | 2/1996 | Sharma et al. | 364/488 |
| 5,541,849 | 7/1996 | Rostoker et al. | 364/489 |
| 5,544,066 | 8/1996 | Rostoker et al. | 364/489 |
| 5,553,002 | 9/1996 | Dangelo et al. | 364/489 |
| 5,555,201 | 9/1996 | Dangelo et al. | 364/489 |
| 5,572,436 | 11/1996 | Dangelo et al. | 364/489 |
| 5,598,228 | 1/1997 | Saitoh | 348/732 |
| 5,598,344 | 1/1997 | Dangelo et al. | 364/489 |
| 5,610,833 | 3/1997 | Chang et al. | 364/491 |
| 5,661,526 | 8/1997 | Hamamoto et al. | 348/465 |
| 5,982,411 | 11/1999 | Eyer et al. | 348/734 |

*Primary Examiner*—Michael H. Lee
*Attorney, Agent, or Firm*—J. William Wigert, Jr.; Crosby Heafey Roach & May

[57] ABSTRACT

An autoprogrammer is provided for a television receiver capable of receiving conventional analog (NTSC) channels and DTV (8VSB) channels. First, conventional analog channels are identified and then skip channel data for each of the channels is stored in a memory. Subsequent executions of the autoprogramm function map DTV channels. Skip channel data is entered in the memory for these additional DTV channels. Mapping DTV channels occurs without deletion or overwrite of previous channel mapping information. Additionally information is stored in the skip channel memory giving antenna location for mapped DTV stations. DTV autoprogramming can be carried out at different channel positions.

9 Claims, 5 Drawing Sheets

| CHANNEL | SKIP FLAG DATA | NTSC/8 VSB | ANTENNA POSITION |
|---|---|---|---|
| 2 | 0 | | |
| 3 | 0 | | |
| 4 | 1 | 1 | 90 |
| 5 | 1 | 0 | 100 |
| 6 | 1 | 1 | 105 |
| 7 | 0 | | |
| 8 | 1 | 0 | 100 |
| 9 | 1 | 1 | 100 |
| 10 | 0 | | |
| ⋮ | | | |
| 125 | 0 | | |

SKIP FLAG     0 SKIP, 1 DO NOT SKIP

NTSC/ 8 VSB     0 NTSC, 1 8 VSB

ANTENNA POSITION     POSITION IN DEGREES

FIG. 7

AUTO PROGRAM FEATURE FOR A TELEVISION RECEIVER

BACKGROUND OF THE INVENTION

1. Field of the Invention

The present invention relates to an automatic program feature for a television receiver, and more particularly, to an, autoprogram feature for a television receiver capable of receiving conventional analog channels as well as digital television channels.

2. Description of the Prior Art

When a television is first plugged in, the channel map or skip channel data base contained in the television receiver contains no channel information. Thus, when the user enters a channel change command such as channel up, the receiver tunes the next higher channel regardless of whether or not a signal is present. This is also the case for channel changes for decrementing the channel number.

Before the advent of the autoprogramming function a user had to remember the physical channel numbers of the available channels and manually enter them. More advanced television receivers included a programmable channel mapping data base which permitted the entry or deletion of channels from the data base. This was an improvement over having no channel map data base, but it required much time and effort by the user to program the channel mapping data base.

Autoprogramming is commonly available for conventional analog television receivers. Autoprogramming performs the function of automatically sequencing through all of the channels available by a television receiver and determining which ones are in use and which ones are not. The autoprogram function scans from either the lowest or highest tunable channel and stores a marker as to whether a channel contains a valid signal or not into a channel mapping data base. Subsequent executions of the autoprogram function resets the current data base and rewrites the flag used to skip channels that do not contain a valid signal. The user can use the autoprogramming feature anytime. For example, if a user moves to another area, or the local cable company adds or deletes channels, the user merely uses this feature to automatically re-program his television receiver.

A typical autoprogramming arrangement is disclosed in U.S. Pat. No. 4,870,492 entitled "Television Receiver Having Automatically Programmable Skip Channel List." This patent discloses a television receiver having a channel skip function capable of skipping a channel on the basis of skip flag data stored in a memory. The autoprogramming feature determines which channels are in use and stores skip channel data in a memory so that unused channels are not accessed by the user.

Autoprogramming systems such as that described above assume that all channels sequenced by the autoprogramming feature are provided from a single, input source. That is, is, if a user has as the input source, a cable provider, all of the available channels come from this single input. If the input is an antenna, likewise, all of the available channels are assumed to come from the antenna. When the autoprogramming feature is initiated by the user, a new channel mapping data base is created each time which only includes the channels which contain a valid signal. However, each time an autoprogram function is executed it ignores the current contents of the channel map data base and creates a new data base based upon the currently available channels. In other words, current autoprogramming systems do not permit multiple executions of the autoprogram function without overwriting the originally stored channel data.

Digital television is emerging as the future of television broadcasts. Initially, all DTV will be transmitted terrestrially, e.g., over the airways as opposed to cable. This is because DTV's format is not compatible with standard NTSC formats, or PAL and SECAM formats :abroad, for cable transmission. Thus an antenna will be the input source for DTV and the availability of a valid DTV signal is affected by the positioning of the receiver's antenna. This is true whether the antenna is a rotatable one mounted on a roof or the like, or is an indoor antenna associated with the television receiver.

This presents a problem when attempting to channel map a television receiver which receives both conventional analog (NTSC) and digital television (DTV) signals. With DTV, it may not be possible to make a complete mapping of the currently available DTV channels during one autoprogramming operation with the antenna in a single position. Since existing autoprogrammers simply write over the existing channel map data base, and are not capable of automatically adding additional channels, such as DTV channels, this prevents a complete channel map from being made of both conventional analog as well as DTV channels.

SUMMARY OF THE INVENTION

It is therefor an object of the invention to provide autoprogramming even if the availability of signals on a channel is not continuous or reliable.

Another object of the invention is to provide autoprogramming for a television receiver which is capable of receiving conventional analog television signals, as well as digital television signals.

In accordance with the present event, a autoprogrammer is provided for standard television receiver capable of receiving conventional analog (NTSC) channels and DTV (8VSB) channels. First, conventional analog channels are identified and then skip channel data for each of the channels is stored in a memory, in the conventional fashion. Subsequent executions of the autoprogram function are made to map DTV channels. Skip channel data is entered in the memory for these additional DTV channels during subsequent autoprogramming passes. The mapping of additional DTV channels occur without deletion or overwrite of the previous channel mapping information.

In accordance with the present invention, an improved autoprogramming method and apparatus is provided which additionally stores information in the skip channel memory about the antenna locations for mapped DTV stations.

The foregoing and other objectives, features and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 7 is a schematic representation of the skip data memory with storage of antenna position data along with skip channel data for NTSC and DTV channels

DETAILED DESCRIPTION OF THE PREFERRED EMBODIMENT

Figure 1:
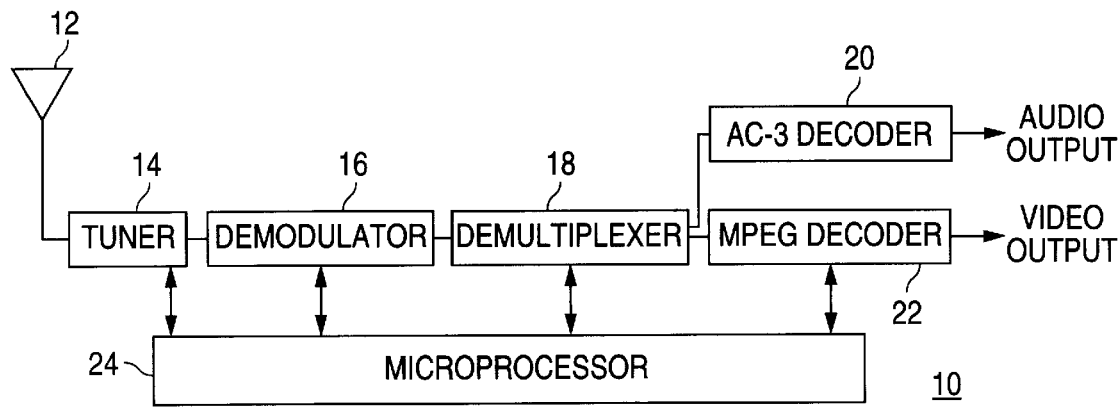
FIG. 1 is a block schematic diagram of a conventional television receiver capable of receiving DTV channels.

FIG. 1 is a block diagram of a conventional DTV television receiver. DTV signals are presently only transmitted through the atmosphere and are received by an antenna 12. Since DTV signals are only transmitted terrestrially and are not compatible with cable transmission. In the United States the DTV format is 8VSB, which is well known. A tuner 14 identifies and isolates individual channels. A demodulator circuit 16 detects whether a valid DTV signal is present or not. Demultiplexer 18 separates the audio and video portions of the high definition DTV signal, as well as other broadcast data and service signals. Audio decoder 20 decodes the audio portion of the demultiplexed signal. The audio portion of the signal is in Dolby AC-3 audio format. Video decoder 22 decodes the MPEG video signals, the video format used in the United States. Operation of the DTV receiver functions are under the control of microprocessor 24.

Figure 2:
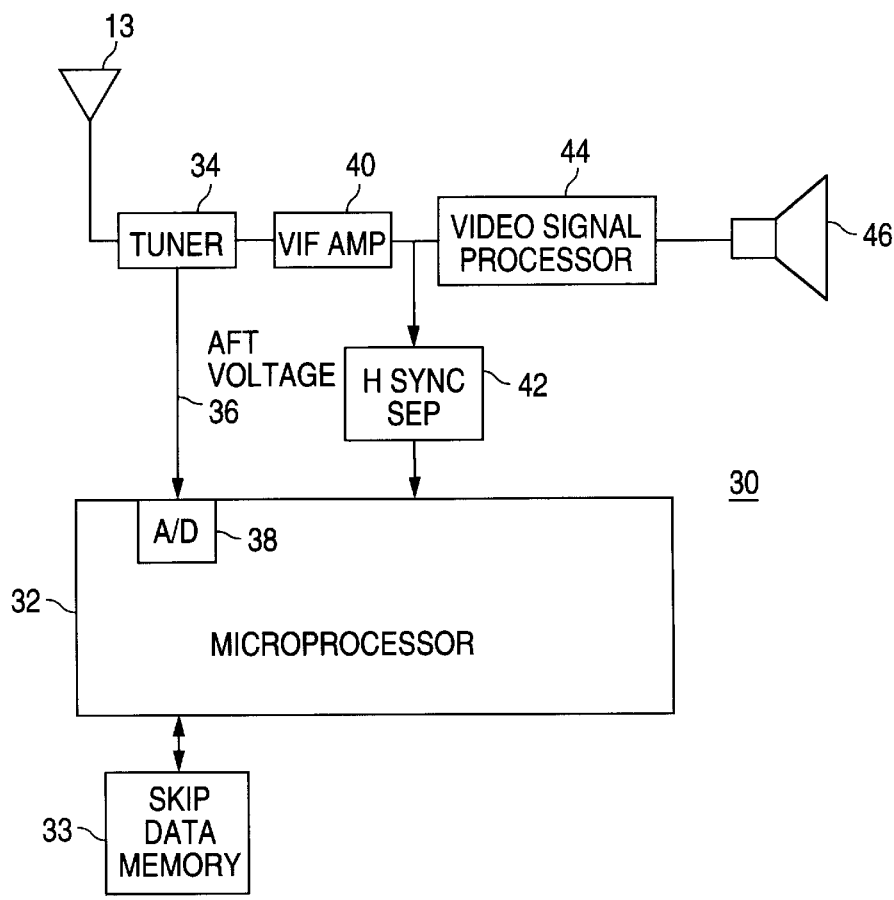
FIG. 2 is a block schematic diagram of a conventional television receiver for receiving NTSC (analog) channels.

A conventional NTSC television receiver 30 is shown in FIG. 2. Television signals are sent to tuner 34 from either an antenna or by cable 13. Microprocessor 32 generates data to control the phase lock loop (PLL) circuit within tuner 34. This tuning data is sent in a serial stream to the tuner 14, which tunes to the desired NTSC channel. Inside tuner 34 an automatic fine tuning (AFT) voltage 36 is generated and this analog signal is made available to microprocessor 32 via an analog-to-digital circuit 38. When a signal is present, an AFT voltage 36, which is within a defined range, is detected by microprocessor 32. Once the AFT voltage has settled, to ensure that the detected signal is the video carrier and not the sound carrier, the video output signal of the video IF (VIF) amplifier stage 40 is sent to a horizontal sync separator circuit 42. The output of this circuit is sent to a port on the microprocessor 32 which then samples the inputted signal to verify that the horizontal sync signal is actually 15.734 kHz. If it is not, then either the sound carrier has been locked on to or else the signal is not a valid NTSC signal. When a NTSC signal is present it is processed and displayed by CRT 46.

Figure 3:
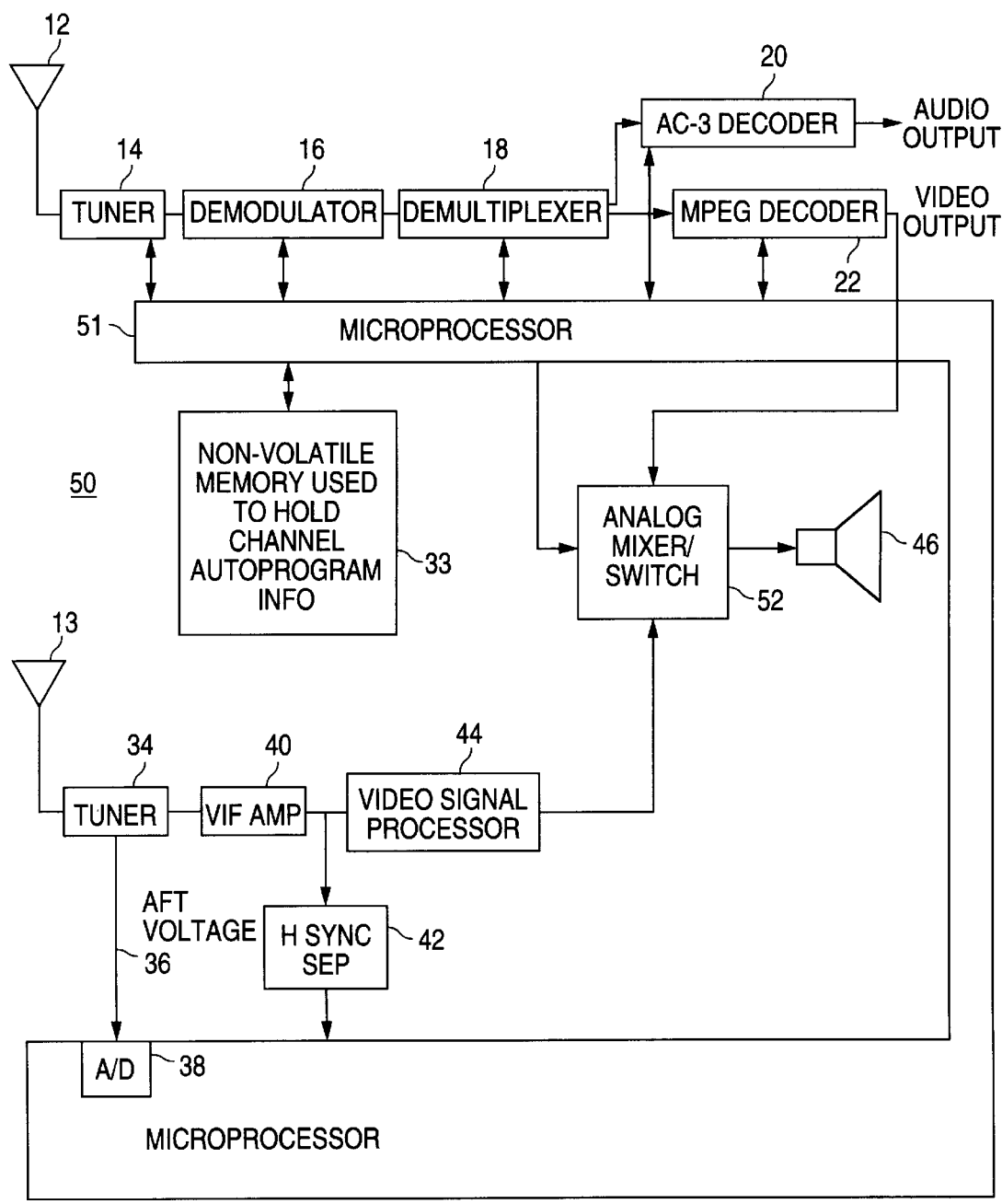
FIG. 3 is a block schematic diagram of a conventional digital/NTSC television receiver but which incorporates the features of the present invention.

In FIG. 3 conventional NTSC and DTV circuitry are combined into a single television receiver 50, which displays either NTSC channels or DTV channels. Where the same elements shown in FIGS. 1 and 2 are shown in FIG. 3 the same reference numerals as used. The digital video output from the decoder 20 and the analog video output from the video signal processor 44 are switched as required by analog mixer/switch 52 for display on CRT 46. A microprocessor 51 controls the functions of the NTSC and DTV components as well the as the autoprogramming feature of the present invention. More than one picture can be simultaneously displayed on the CRT 46 by using a scaling circuit and a superimpose circuit. One picture can be full sized and a second picture can be scaled so that it overlays the primary picture. Alternatively, both pictures can be scaled so that two pictures can be placed side by side.

Figure 4:
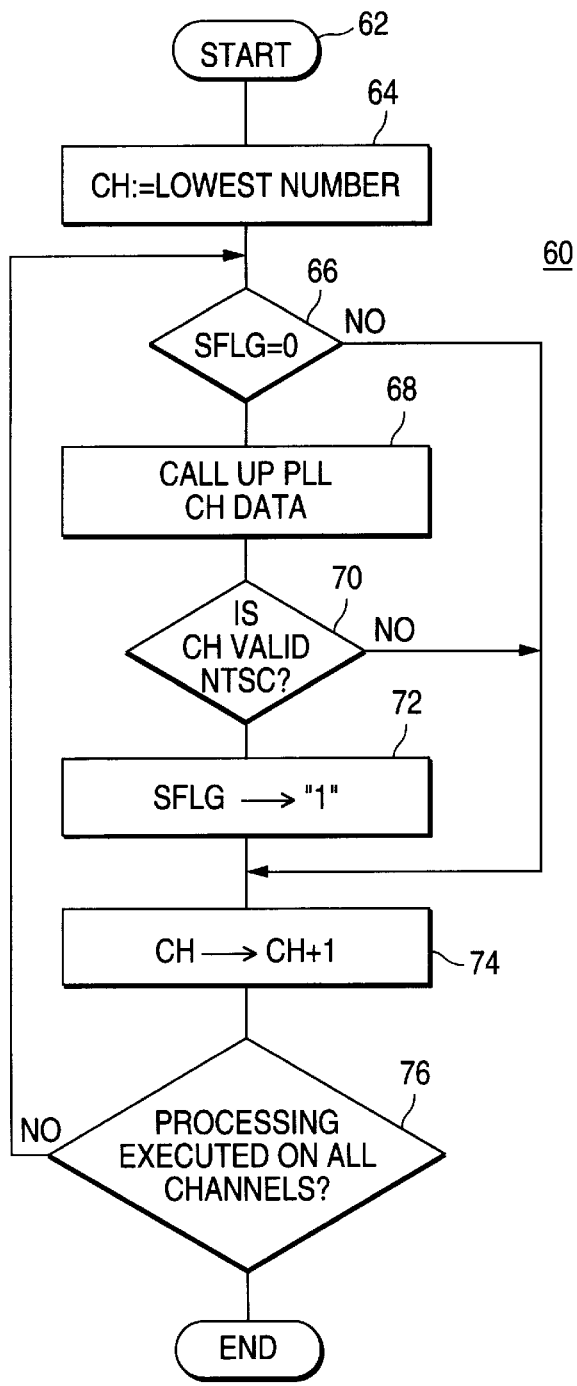
FIG. 4 is a flow chart illustrating a routine for autoprogramming a conventional analog television receiver.

Referring additionally to FIG. 2, FIG. 4 is a flow diagram 60 showing a conventional autoprogramming function for a standard NTSC television receiver such as that described in U.S. Pat. No. 4,870,492. Autoprogramming is initiated at 62 by the user. The lowest (or highest) channel is accessed, at 64, by tuner 34. Initially, before an autoprogram operation, a "zero" is set in the memory 33 for all channels for the skip flag (SFLG) data. Typically, NTSC tuners include a phase lock loop (PLL) to synthesize the tuning signal for a channel. At block 68, channel data is accessed and at 70 a determination is made as to whether a valid NTSC channel is present. If not, SFLG data of "zero" remains entered in memory 33 for that channel and the next channel is incremented, as shown in block 74. If it is a valid NTSC channel, the a SFLG data of "one" is entered in memory 33 for that channel as indicated at 72. The next channel is accessed and the inquiry is repeated, with a "one" entered as the SFLG for each valid NTSC channel and a "zero" is left where no valid NTSC channel is present. Once all of the tuner's available channels are accessed, block 76, the autoprogram ends. When a user selects channels, only those with a "one" in the skip data memory 33 will appear on the screen and the rest will be skipped when operated by a user.

Figure 5:
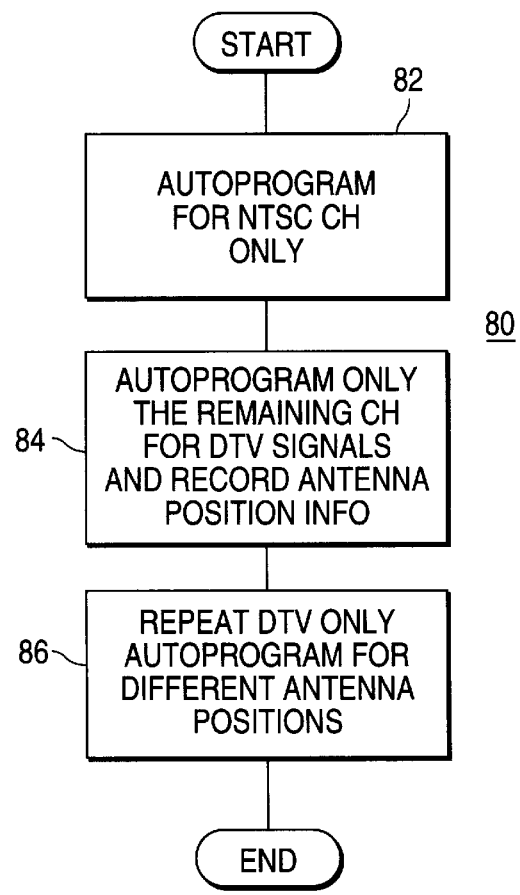
FIG. 5 is a flow diagram of the overall autoprogram method and apparatus of the present invention.

FIG. 5 is a block diagram 80 showing the overall structure of the autoprogramming feature for a combined NTSC/DTV receiver 50, in accordance with the present invention. As indicated in block 82, the television receiver 50 is first autoprogrammed in the conventional manner, as shown in FIG. 4 for the NTSC channels only. Next, the receiver is autoprogrammed for DTV signals and antenna position information is also recorded. Finally, at block 86 autoprogramming is repeated for mapping additional DTV channels with the antenna located at different positions.

Figure 6:
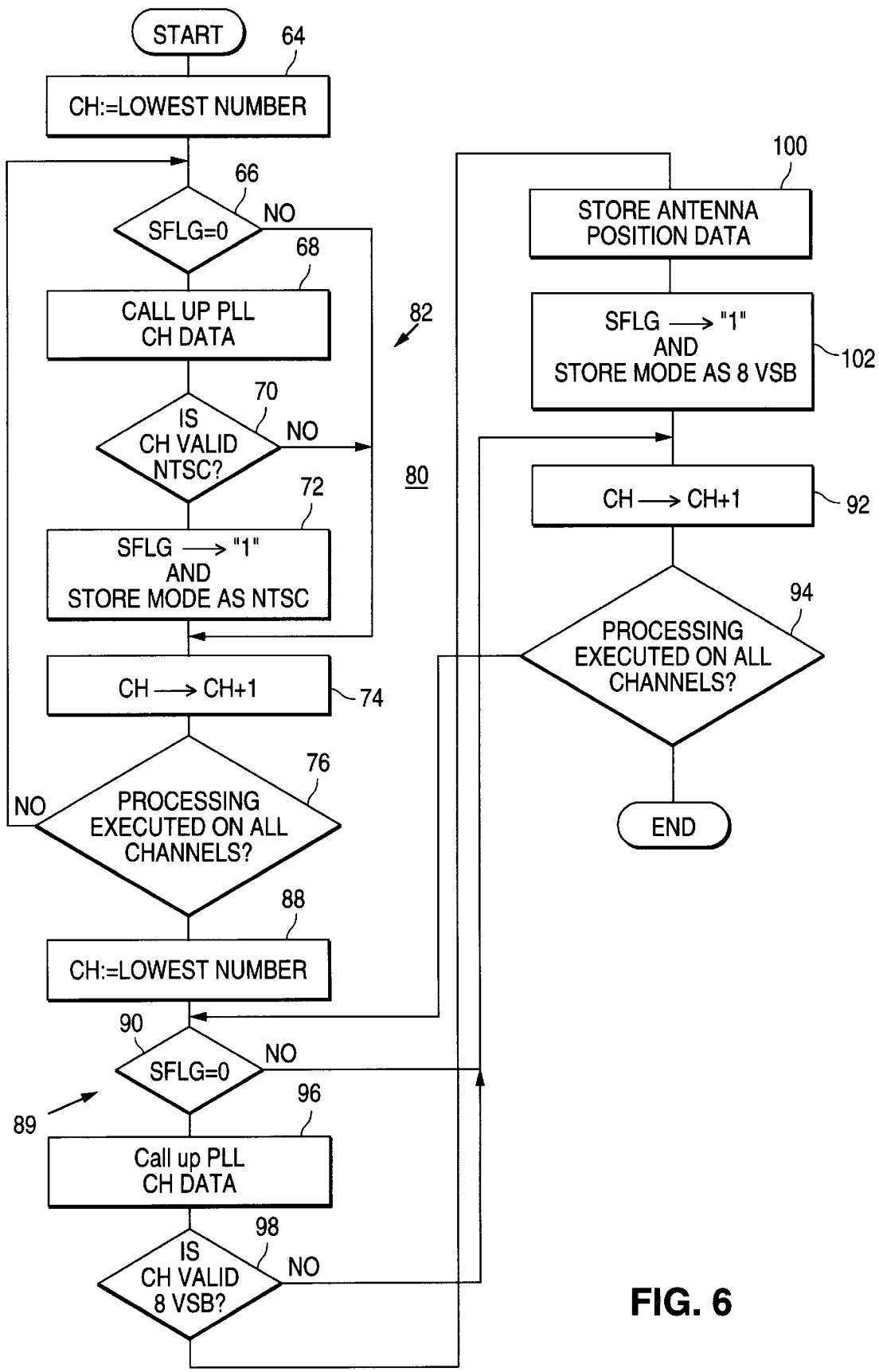
FIG. 6 is a detailed flow diagram for autoprogram of the present invention for analog/digital television receivers.

Details of the combined NTSC/DTV autoprogramming feature of the present invention are shown in FIGS. 6 and 7. As shown and explained with respect to block 82 of FIG. 5, autoprogramming is initially executed for valid NTSC channels only. Details of block 82 are shown in FIG. 6. This part of the autoprogram routine, carried out by microprocessor 51, functions in the same manner as that of a standard NTSC autoprogrammer, with only valid NTSC stations being mapped in the skip data memory 33. Thus, common elements from prior art autoprogrammer 60 of FIG. 4 are identified with like reference numerals in FIG. 6.

The autoprogram routine 80 first maps NTSC channels in order to decrease the time required to autoprogram since looking for both valid NTSC and 8VSB (MTV) signals is time consuming. The contents of the skip data memory 33 is shown schematically in FIG. 7. Under the column entitled "channel", for each NTSC channel detected, a "1" is entered in the memory 33, under the column entitled "skip flag data", to change the initial condition of "0". A "1" indicates that such a channel is not to be skipped during operation by the user. A "1" is also separately entered in a column entitled "NTSC/8VSB" when a NTSC channel is identified. The video signal for NTSC can be provided by cable or by an antenna. If it is provided by an antenna, the position of the antenna for reception of a particular NTSC channel can be stored under "antenna position".

Once a channel map containing valid NTSC channels is completed, block 76, autoprogramming of the DTV channels begins in section 84 of the flow diagram. The tuner 14, at 88, is set to the lowest channel which hasn't already been mapped during the autoprogram of the NTSC channels. At decision block 90, if, for the lowest number channel SFLG isn't "0", e.g. isn't mapped, then the channel is incremented one channel at 92. Until all channels have been processed, block 94 returns the routine to 90 where the channel will continue to be incremented by one until SFLG=0, indicating that an NTSC channel has not been mapped. When this occurs the PLL of the demodulator 18 calls up channel signal data to determine if it is a valid DTV (8VSB) channel, at 98. If it isn't, the routine increments the channel number as explained above. If it is, position data is stored in memory 33 (block 100) and SFLG data of "1" is stored in memory 33 (block 102) indicating a valid DTV channel.

There are several ways demodulator 16 can determine if a particular channel is a valid 8VSB channel. One way is to determine the presence of the 8VSB pilot signal. Another way is to obtain a valid segment and/or field sync signal. Establishing a valid NTSC signal is well known in the prior art. For example, one way is to identify the horizontal and/or vertical sync signals. Since the field sync for 8 VSB is considerably longer at 24.2 msec. versus 16.7 msec. for NTSC, the detection can be done once to discriminate between the analog and digital channels.

When all of the channels have been incremented autoprogramming for the DTV channels for that particular antenna location is completed. Since DTV channels are transmitted terrestrially, frequently from different locations, a valid DTV channel may not be picked up during the initial autoprogram operation for DTV channels. Thus, the autoprogram function can be repeated with the antenna located, or rotated, to different positions to map additional DTV channels. It is a feature of the present invention that the autoprogram routine can be repeated with additional channels being mapped, without overwriting the channels which are already mapped.

The present invention has been described for use with a combined NTSC/8VSB format. These are the standard analog and video formats, respectively, in the United States. Many countries outside of the United States use either PAL or SECAM analog formats and other digital formats. The present invention is equally applicable to other such formats.

Although the present invention has been shown and described with respect to preferred embodiments, various changes and modifications are deemed to lie within the spirit and scope of the invention as claimed. The corresponding structures, materials, acts, and equivalents of all means or step plus function elements in the claims which follow are intended to include any structure, material, or acts for performing the functions in combination with other claimed elements as specifically claimed.

What is claimed is:

1. A television receiver for receiving analog and digital television channels comprising:
    a memory for storing skip data indicative of whether a channel is to be skipped or not;
    an input for receiving channels, the input including at least an antenna capable of being moveable to different positions;
    a tuner for selecting individual channels, the tuner being coupled to the input;
    a detector coupled to the tuner for determining whether a particular channel is analog or digital;
    first means for autoprogramming only analog channels by storing skip data in the memory for each analog channel detected; and
    second means for autoprogramming digital channels by adding skip data in the memory for each digital channel detected.

2. A television receiver as in claim 1 wherein the moveable antenna's position for each stored digital channel is additionally stored in the memory.

3. A television receiver as in claim 2 wherein the second means for autoprogramming digital channels is repeated with the antenna in different positions.

4. A television receiver as in claim 1 wherein the analog channels are in NTSC format and the digital channels are in 8VSB format.

5. A method of autoprogramming a television receiver which receives analog and digital television channels comprising:
    storing skip data indicative of whether a channel is to be skipped or not in a memory;
    inputting television signals from an antenna or other input source to a tuner for selecting individual channels;
    detecting whether a particular channel is analog or digital;
    autoprogramming only analog channels by storing skip data in the memory for each analog channel detected; and
    autoprogramming digital channels by adding skip data in the memory for each digital channel detected.

6. The method of claim 5 including the step of storing antenna position data for each stored digital channel in the memory.

7. The method of claim 6 including the step of adding additional digital channels and additional antenna position data in the memory with the antenna located in different positions.

8. An autoprogrammer for a television receiver capable of receiving conventional analog (NTSC) channels and DTV (8VSB) channels comprising:
    a skip channel memory;
    means for identifying conventional analog channels and then storing skip channel data for each identified channel in the skip channel memory; and
    means for subsequently identifying DTV channels and then storing skip channel data for each identified DTV channels in the skip channel memory without deletion or overwrite of previous channel mapping information.

9. An autoprogrammer as in claim 8 including means for additionally storing information in the skip channel memory giving antenna location for mapped DTV stations.

* * * * *